United States Patent
Delavari-Maraghi et al.

(10) Patent No.: US 12,164,953 B2
(45) Date of Patent: Dec. 10, 2024

(54) SYSTEM AND METHOD FOR HANDLING REAL-TIME TRANSACTIONAL EVENTS

(71) Applicant: The Toronto-Dominion Bank, Toronto (CA)

(72) Inventors: Syrous Delavari-Maraghi, Vaughan (CA); Carlton Anthony Raymond, Mississauga (CA); Alexandre Granzer-Guay, Toronto (CA)

(73) Assignee: The Toronto-Dominion Bank, Toronto (CA)

( * ) Notice: Subject to any disclaimer, the term of this patent is extended or adjusted under 35 U.S.C. 154(b) by 0 days.

(21) Appl. No.: 18/537,936

(22) Filed: Dec. 13, 2023

(65) Prior Publication Data
US 2024/0111570 A1    Apr. 4, 2024

Related U.S. Application Data

(63) Continuation of application No. 17/568,155, filed on Jan. 4, 2022, now Pat. No. 11,880,709.

(51) Int. Cl.
*G06F 16/00* (2019.01)
*G06F 9/48* (2006.01)
(Continued)

(52) U.S. Cl.
CPC .......... *G06F 9/485* (2013.01); *G06F 11/0721* (2013.01); *G06F 11/0751* (2013.01); *G06F 11/0775* (2013.01); *G06F 11/1474* (2013.01)

(58) Field of Classification Search
CPC .. G06F 11/0751; G06F 11/0721; G06F 9/485; G06F 11/0775; G06F 9/542;
(Continued)

(56) References Cited

U.S. PATENT DOCUMENTS

| 6,298,072 B1 | 10/2001 | Koliczew |
| 9,311,144 B1 | 4/2016 | Krishnamoorthy |

(Continued)

FOREIGN PATENT DOCUMENTS

| AU | 2015311999 B1 | 5/2020 |
| CN | 112148455 A | 12/2020 |
| EP | 2808792 B1 | 12/2014 |

OTHER PUBLICATIONS

Britto, Andrey, et al.; Speculative out-of-order event processing with software transaction memory; Proceedings of the second international conference on Distributed event-based systems; 2008; https://doc.rero.ch/record/18131/files/Brito_Andrey_-_Speculative_Out-Of-Order_Event_Processing_with_Software_20100429.pdf.

(Continued)

*Primary Examiner* — Yicun Wu
(74) *Attorney, Agent, or Firm* — CPST Intellectual Property Inc.; Brett J. Slaney

(57) ABSTRACT

A system, method, and memory for handling real-time transactional events is disclosed. The exemplary system a processor to detect and add an event to a queue and identify an associated event type. Event types can require downstream processing by at least one provider. The processor decomposes the event into tasks by comparison to event types which associate downstream provider requirements to tasks and routes. One or more routes are assigned to the tasks, each route defined by at least one processor of a plurality of processors. One or more routes are defined by transmitting a request for downstream processing to the at least one provider. The processor, upon detecting incomplete performance of the one or more routes, either updates the tasks associated with the incomplete route, or marks the event associated with the route as incomplete in the queue.

20 Claims, 7 Drawing Sheets

(51) Int. Cl.
*G06F 11/07* (2006.01)
*G06F 11/14* (2006.01)

(58) Field of Classification Search
CPC .. G06Q 20/4014; G06Q 20/10; G06Q 20/023; G06Q 20/02
See application file for complete search history.

(56) References Cited

U.S. PATENT DOCUMENTS

| | | |
|---|---|---|
| 9,747,112 B2 | 8/2017 | Stanfill et al. |
| 9,760,406 B2 | 9/2017 | Stanfill et al. |
| 9,842,000 B2 | 12/2017 | Bishop et al. |
| 9,886,319 B2 | 2/2018 | Wakeling et al. |
| 9,934,070 B2 | 4/2018 | Stanfill et al. |
| 10,146,592 B2 | 12/2018 | Bishop et al. |
| 10,310,896 B1 | 6/2019 | Kichak et al. |
| 10,853,073 B2 | 12/2020 | Fleming, Jr. et al. |
| 2003/0163418 A1 | 8/2003 | Marks |
| 2008/0065648 A1 | 3/2008 | Gupta |
| 2012/0109765 A1 | 5/2012 | Araque |
| 2013/0061288 A1 | 3/2013 | Paim |
| 2013/0339977 A1 | 12/2013 | Dennis et al. |
| 2014/0067677 A1 | 3/2014 | Ali |
| 2015/0295970 A1 | 10/2015 | Wang et al. |
| 2016/0224398 A1 | 8/2016 | Palmer et al. |
| 2019/0378139 A1 | 12/2019 | Stribady et al. |
| 2020/0264932 A1 | 8/2020 | Maldini et al. |
| 2021/0109788 A1 | 4/2021 | Wang et al. |
| 2021/0157648 A1 | 5/2021 | Parikh et al. |
| 2021/0208953 A1 | 7/2021 | Vasileiadis et al. |
| 2023/0073140 A1* | 3/2023 | Richter .................. G06Q 20/02 |

OTHER PUBLICATIONS

Heinze, Thomas, et al.; Cloud-based data stream processing; Proceedings of the 8th ACM International Conference on Distributed Event-Based Systems; 2014; https://eprints.soton.ac.uk/419693/1/CloudBasedDataStreamProcessing.pdf.

* cited by examiner

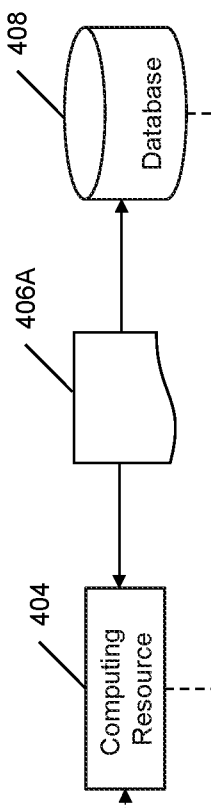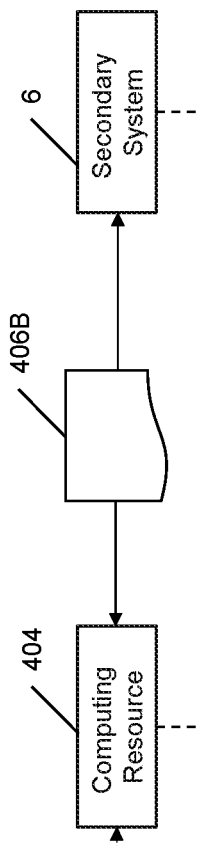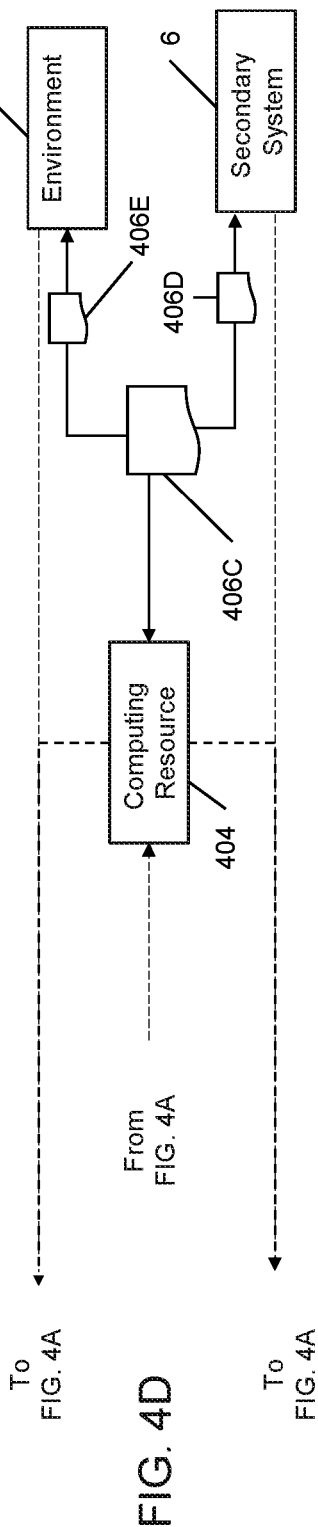

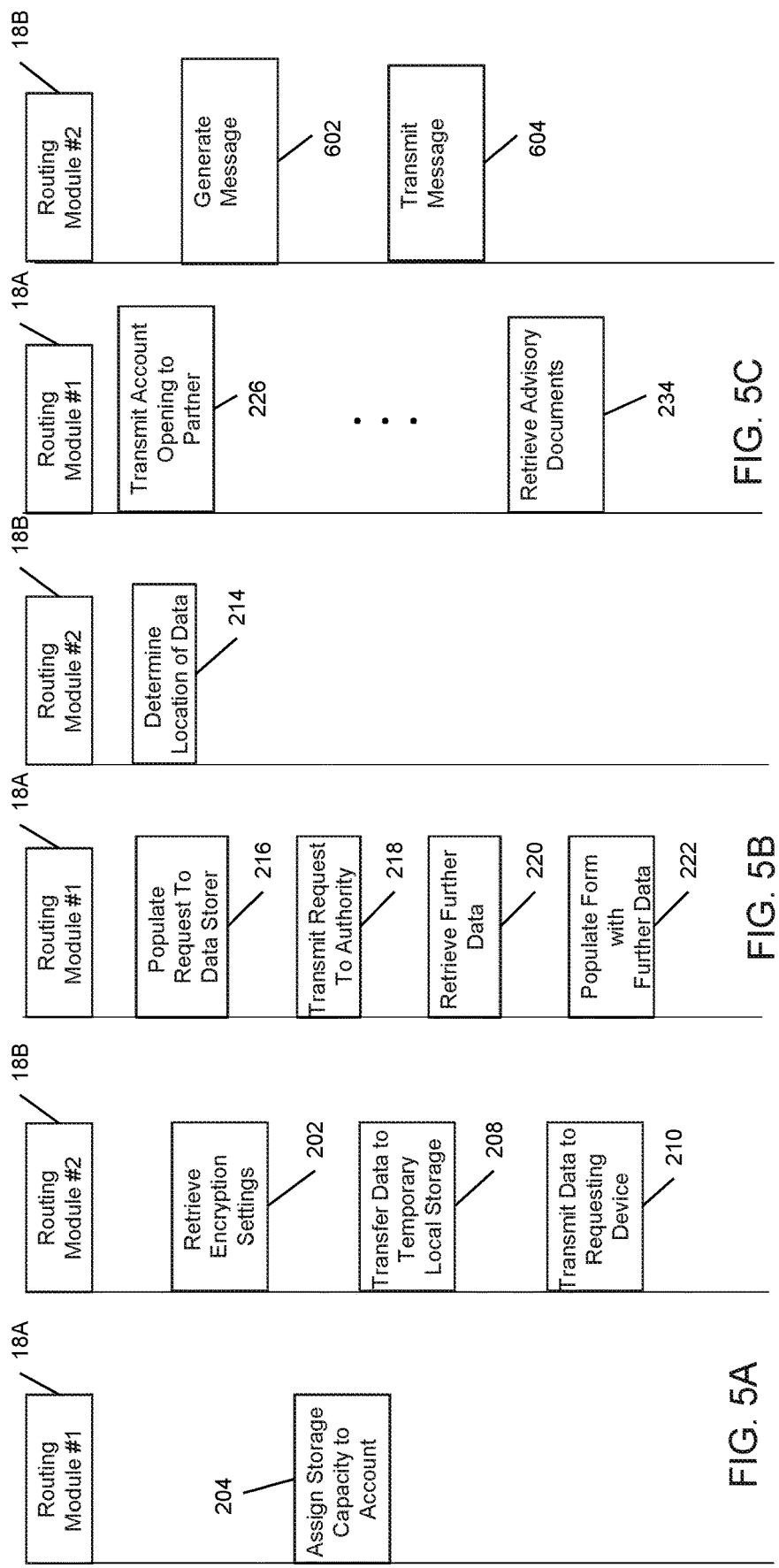

SYSTEM AND METHOD FOR HANDLING REAL-TIME TRANSACTIONAL EVENTS

CROSS-REFERENCE TO RELATED APPLICATION(S)

This application is a Continuation of U.S. patent application Ser. No. 17/568,155 filed on Jan. 4, 2022, the contents of which are incorporated herein by reference in their entirety.

TECHNICAL FIELD

The following generally relates to systems for handling real-time transactional events, and in particular to systems for handling transactions which require cooperation from at least one downstream party.

BACKGROUND

Processing real-time transactions within any entity can expose technical limitations in existing architectures. Design features associated with robustness, such as failsafe or safe fail features, are difficult to implement when transactions are expected to be completed in real time. Moreover, the existing security protocols, data and information management policies, and other protective systems can cause unacceptable delay in processing the transaction.

Customers increasingly expect a single entity to seamlessly handle real time multi-party transactions. Coordinating between parties potentially exacerbates existing issues within a computing architecture, adding the possibly of interconnectivity issues between one or more of the computer architectures of the transacting parties. Coordinating between existing computing systems, which may include legacy architecture, can negatively impact robustness, speed, efficiency, and can compromise existing security protocols, data and information management policies, and other protective systems.

BRIEF DESCRIPTION OF THE DRAWINGS

The present description is illustrated by way of example only with reference to the appended drawings wherein:

FIGS. 4B to 4D are each further schematic diagrams for processing real-time transactions as shown in FIG. 4A.

FIGS. 5A to 5C are each a diagram of a queue state during an example method for handling real time transactions.

DETAILED DESCRIPTION OF THE DRAWINGS

Figure 1:
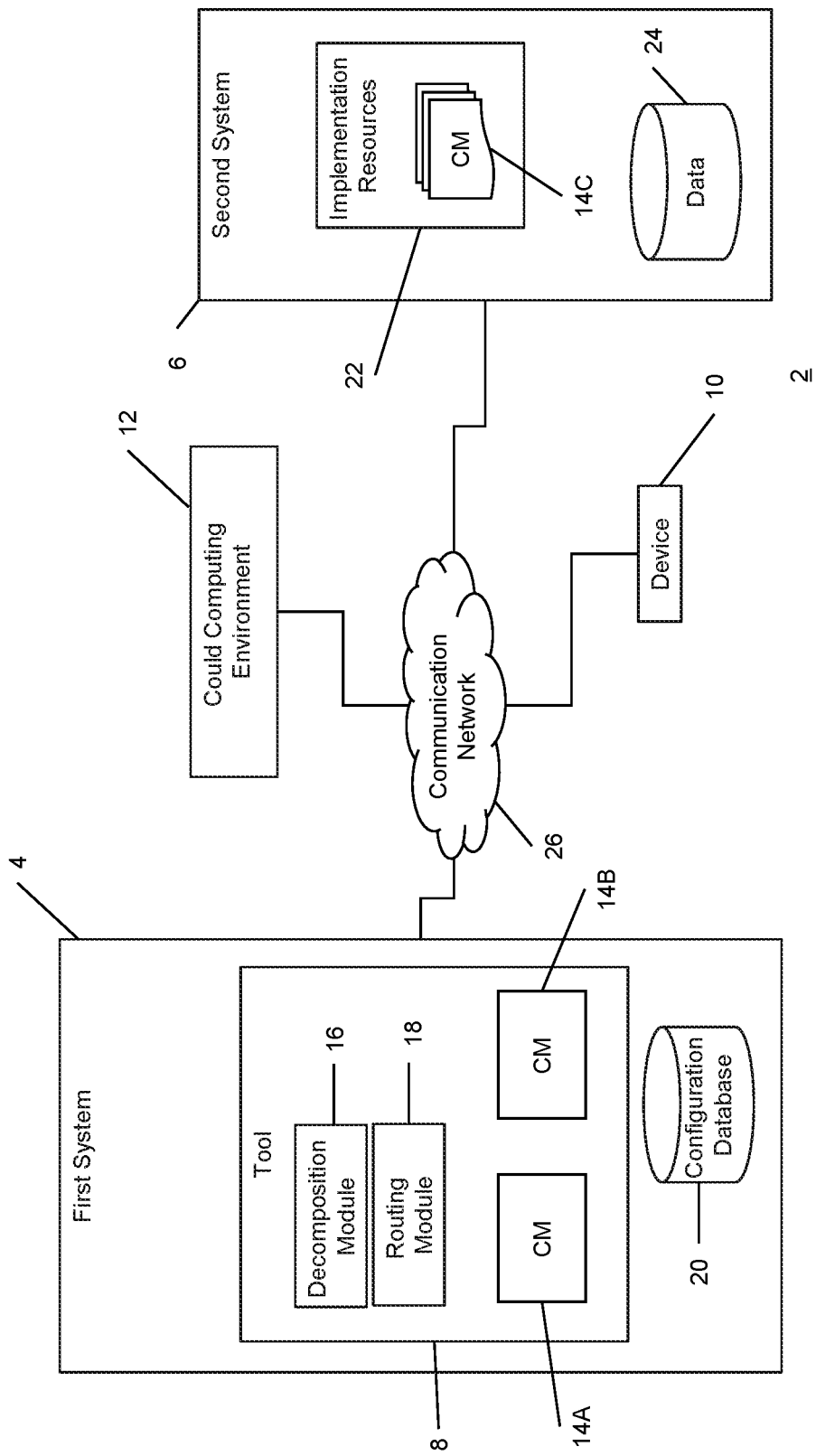
FIG. 1 is a schematic diagram of a computing environment for processing real-time transactions.

It will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures and components have not been described in detail so as not to obscure the example embodiments described herein. Also, the description is not to be considered as limiting the scope of the example embodiments described herein.

In one aspect, this disclosure relates to a system and related method for handling real-time transactional events which include one or more tasks associated with a third-party provider. The method includes decomposing the detected event into one or more sets of tasks with at least one task associated with the third-party provider. The task sets or tasks are each assigned to one or more routes defined by one or more processors of a plurality of processors. The third-party provider reliant task is assigned to a processor capable of communicating with the third-party provider or performing preceding tasks prior to communicating with the third-party provider. In response to determining that any of the tasks or routes are incomplete, the tasks set associated with the incomplete route can be updated, or the event associated with the route can be actively marked as incomplete.

A queue manager responsible for tracking the decomposed event determines or is notified that a route or task is incomplete and can thereafter assign at least part of the route (i.e., at least some tasks of the route) to a second queue manager. The second queue manager can modify parameters associated with received routes, such as a time associated with attempting completion of the route, particular processors assigned to complete certain tasks within the route, and the priority of tasks within the route itself. By changing the time associated with attempting completion, the disclosed method can increase the likelihood that the third-party provider will successfully process the event. For example, if the third-party provider processes retail transactions, assigning the route to be completed overnight can increase the likelihood that the third-party provider will not experience traffic related outages, and therefore can successfully process task.

In example embodiments, decomposing events into tasks includes determining whether any of the constituent tasks are mandatory. By labelling certain tasks as mandatory, the disclosed method can determine routes to the third-party dependent tasks in view of known mandatory tasks. For example, where a process bottleneck includes third party dependent tasks, and that third party dependent task requires retrieving a completed form (e.g., retrieving a completed account opening application), the importance of retrieving the completed form can be increased relative to other tasks which, at least initially, appear more important. Continuing the example, retrieving the completed form may be given a higher importance relative to internal compliance checks as the internal compliance check related processes may be easier to augment, control, or complete.

In at least some example embodiments, the disclosed method allows for more robust handling of real-time transactional events where multiparty cooperation is required. For example, multiple queues can be used to delineate between third party provider tasks which are completed and incomplete. Where the system experiences a shutdown, a status of the event can be determined based on the status of each queue. For example, the status can be determined based on whether there are any incomplete third-party dependent tasks in a first queue and comparing the prior completed task in an expected route. Alternatively, the status can be determined by whether a third-party dependent task was assigned to a second queue manager prior to the system shutdown. The different queues can be stored on different system compartments, such that failure of both queues simultaneously is unlikely.

In one aspect, a system for handling real-time transactional events is disclosed. The system includes a processor, a communications module coupled to the processor, and a memory coupled to the processor. The memory stores computer executable instructions that, when executed by the processor, cause the processor to detect an event and add the event to a queue and identify an event type associated with the event. The event type requires downstream processing by at least one provider. The computer executable instructions include instructions to decompose the event into one or more tasks by comparing the identified event type to a database of event types, wherein the database of event types associates downstream provider requirements to tasks and routes. The computer executable instructions include instructions to assign one or more routes to the one or more tasks, with the one or more routes being defined by at least one processor of a plurality of processors. At least one of the one or more routes is defined at least in part by transmitting a request for downstream processing to the at least one provider. The computer executable instructions include instructions to upon detecting incomplete performance of the one or more routes, executing at least one of (1) updating the tasks associated with the incomplete route, or (2) marking the event associated with the route as incomplete in the queue.

In another aspect, a method of handling real-time transactional events is disclosed. The method includes detecting an event and add the event to a queue, and identifying an event type associated with the event, wherein the event type requires downstream processing by at least one provider. The method includes decomposing the event into one or more tasks by comparing the identified event type to a database of event types, wherein the database of event types associates downstream provider requirements to tasks and routes. The method includes assigning one or more routes to the one or more tasks, the one or more routes defined by at least one processor of a plurality of processors, wherein at least one of the one or more routes is defined at least in part by transmitting a request for downstream processing to the at least one provider. The method includes, upon detecting incomplete performance of the one or more routes, initiating at least one of (1) updating the tasks associated with the incomplete route; or (2) marking the event associated with the route as incomplete in the queue.

In yet another aspect, a non-transitory computer readable medium for determining anonymization system quality is disclosed. The computer readable medium includes computer executable instructions for detecting an event and add the event to a queue, and identifying an event type associated with the event, wherein the event type requires downstream processing by at least one provider. The computer executable instructions include instructions for decomposing the event into one or more tasks by comparing the identified event type to a database of event types, wherein the database of event types associates downstream provider requirements to tasks and routes. The computer executable instructions include instructions for assigning one or more routes to the one or more tasks, the one or more routes defined by at least one processor of a plurality of processors, wherein at least one of the one or more routes is defined at least in part by transmitting a request for downstream processing to the at least one provider. The computer executable instructions include instructions for, upon detecting incomplete performance of the one or more routes, initiating at least one of (1) updating the tasks associated with the incomplete route; or (2) marking the event associated with the route as incomplete in the queue.

In an example embodiment, marking the event as incomplete can include modifying parameters associated with the incomplete route; and completing the event with the modified parameters.

In an example embodiment, the modified parameters can include at least one of: a time associated with attempting the incomplete route, processors of the plurality of processors assigned to the incomplete route, and a priority of the incomplete route compared to other tasks or routes.

In an example embodiment, marking the event as incomplete can include assigning tracking of the incomplete route to a second queue, the second queue modifying parameters associated with the incomplete route.

In an example embodiment, the system can detect whether a failure occurs in the queue; and determine a completion status of the event based on the tracked completion of tasks assigned to the second queue.

In an example embodiment, the system can detect a failure of at least one of the plurality of processors defining the one or more routes; and determine a status of the one or more routes based on the tracked completion of tasks assigned to either of the queue or the second queue.

In an example embodiment, updating tasks associated with the incomplete route can include identifying one or more functionalities associated with the event; generating one or more messaging tasks for notifying a requester that the one or more functionalities are inactive; assigning the generated one or more messaging tasks to the updated tasks; and assigning an elevated priority to the generated one or more messaging tasks.

In an example embodiment, the system can determine mandatory tasks within the decomposed one or more tasks; detect whether the mandatory tasks associated with the event have been completed; and remove the one or more routes from the queue in response to determining the mandatory tasks have been completed.

In an example embodiment, the system can determine which of the plurality of processors satisfies resource access criteria required to complete the mandatory tasks; and assign the mandatory tasks to the determined processors.

In an example embodiment, the satisfied resource access criteria can specify one of: access to a protected database, access to messaging hardware, access to ancillary information required to complete the mandatory tasks, and access to one or more redundant channels.

In an example embodiment, the system can update the database in response to receiving one or more configuration parameters from the at least one provider.

In an example embodiment, each of the one or more tasks can include parameters responsive to at least one of: a priority compared to other tasks of the one or more tasks, whether the task is optional compared to other tasks of the one or more tasks, a routing destination upon task failure, a required completion time associated with the task, a subsequent task of the one or more tasks, whether a previous route failed, and a number of times the task failed.

FIG. 1 illustrates an exemplary computing environment 2, which includes a first system 4 (hereinafter referred to as a "primary system"), and a second system 6 (hereinafter referred to in the singular as the "secondary system"). It is understood that the secondary system 6 operates at least in part independently of the primary system 4. For example, the secondary system 6 can be operated by a first corporate entity, whereas the primary system 4 can be operated by a different corporate entity. Although not shown, it is understood that the computing environment 2 can include more than one secondary system 6.

In the illustrated embodiment, the primary system 4 includes a tool 8. Tool 8 includes one or more special purpose processors for performing the processes set out herein for handling real-time transaction events. The special purpose processors can be located within a single system, such as a subsystem within the primary system 4, or located in multiple different systems controlled by the operator of the primary system 4, including, for example, embodiments where in at least some of the special purpose processors are located on a cloud computing environment 12. For greater clarity, in example embodiments, the processes described herein being carried out by the primary system 4 can at least in part be completed by the cloud computing environment 12. In at least some example embodiments, the tool 8 includes one or more general-purpose processors to execute at least some of the processes as described herein.

In addition to the special purpose processors, tool 8 includes one or more communication modules 14A for communicating with the secondary system 6. The one or more communication modules 14A can include various combinations of a receiver, transmitter, or transceiver, to either transmit or receive messages from the secondary system 6. The one or more communication modules 14A can include one or more configuration parameters that facilitate or aid communication with the secondary system 6. For example, the one or more communication modules 14A can include routines which convert any messages originating with the primary system 4 and intended for the secondary system 6 into transmissions which are compliant with an encryption protocol used by the secondary system 6. Similarly, the one or more communication modules 14B can be used for communicating with other devices or special purpose processors within the primary system 4, including any routines required to achieve successful communication with said resources.

The primary system 4 can also include a configuration database 20. As will be described herein, the configuration database 20 can be queried by the tool 8, by the cloud computing environment 12, or by a device 10 to compare or determine one or more parameters or metadata associated with an event. In the shown embodiment, the configuration database 20 is located within the primary system 4, however it is understood that the configuration database 20 can be located in other than the primary system 4, such as the cloud computing environment 12, or be located in a system independent of the entities operating either of the primary system 4 and any secondary systems.

In at least some example embodiments, the configuration database 20 includes a mapping between tasks and associated event types. For example, an account opening event type can be associated with various update and transmission tasks to ensure that the account opening is completed, or the event type can be associated with tasks to generate messages conveying a status to the requester (e.g., that the functionality associated with the account opening is enabled, etc.). Some event types require at least some processing by the secondary system 6 (alternatively referred to as a downstream processor or downstream processing provider), and configuration database 20 can be configured to allow the primary system 4, the secondary system 6, or both systems 4 and 6 to update event types, tasks or event type—task associations. For example, the secondary system 6 can transmit one or more configuration parameters (e.g., encryption protocol, required information, etc.) to the configuration database 20 to update tasks associated with events related to the secondary system 6, such that tasks which require the secondary system 6 which originate in the primary system 4 comply with requirements imposed by the secondary system 6.

The device(s) 10 of the computing environment 2 may be associated with one or more users. Users may be referred to herein as customers, clients, correspondents, or other entities that interact with either the primary system 4 and/or the secondary system 6, directly or indirectly. The computing environment 2 can include multiple devices 10, each device 10 being associated with a separate user or associated with one or more users. In certain embodiments, a user may operate device 10 such that device 10 accesses or otherwise interacts with either of the systems. For example, the user may use device 10 to engage and interface with the tool 8 to initiate an event, or to review configurations stored in configuration database 20, and so forth. In certain aspects, the device 10 can include, but is not limited to, a personal computer, a laptop computer, a tablet computer, a notebook computer, a hand-held computer, a personal digital assistant, a portable navigation device, a mobile phone, a wearable device, a gaming device, an embedded device, a smart phone, a virtual reality device, an augmented reality device, third party portals, an automated teller machine (ATM), and any additional or alternate computing device.

Referring again to the tool 8, it also includes a decomposition module 16 and a routing module 18. The decomposition module 16 can detect events (e.g., requests to initiate a real-time transaction), identify a particular event type associated with the detected event, and decompose the detected event into one or more tasks or one or more task sets (i.e., task groupings). The one or more tasks may include tasks that are completed within the primary system 4, and further include at least one task that is completed within, or requires confirmation from, the secondary system 6.

The routing module 18 can determine or define routes for completion of decomposed tasks. Routes can define the particular processor(s) used to execute a particular task, the relative ordering between tasks within each task set, the ordering of a task relative to another task set, and the relative ordering between tasks sets associated with the event, etc. For example, the routing module 18 can have awareness, via setup parameters, of at least the communication capabilities of the special purpose processors of the tool 8 so as to route tasks associated with the secondary system 6 to special purpose processors capable (e.g., with the required configuration) of communicating with the environment. The routing module 18 can also have awareness of other factors to complete route mapping or assignment, such as the relative load experienced by elements of the tool 8 (e.g., by sending periodic queries to each processor), whether any of the decomposed tasks require access to quarantined or restricted resources within the primary system 4, etc. Although shown in the singular, routing module 18 can include multiple instances of the routing module, with each routing module assigned different routing responsibilities.

The routing module 18 can also be responsible for tracking completion of the tasks as they progress along a route. For example, the routing module 18 can function as a queue manager, tracking whether a task has been completed, whether a task subset has been completed, and so forth. Tracking can be implemented by periodic queries to each processor, or the tasks themselves may incorporate a step of reporting to the routing module 18, and so forth.

The secondary system 6 includes one or more implementation resources 22, which can include special purpose processors, and a communications module 14C similar to the communications module 14A. The secondary system 6 can include data stored in a database 24 which may be required to complete certain decomposed tasks. For example, the database 24 can store credentials, a book of record related to systems or processes employed by the secondary system 6, and so forth.

The secondary system 6, the primary system 4, and the cloud computing environment 12 (if any), can communicate with one another via the communications network 26. Communication network 26 may include a telephone network, cellular, and/or data communication network to connect the various computing environments. For example, the communication network 26 may include a private or public switched telephone network (PSTN), mobile network (e.g., code division multiple access (CDMA) network, global system for mobile communications (GSM) network, and/or any 3G, 4G, or 5G wireless carrier network, etc.), WiFi or other similar wireless network, and a private and/or public wide area network (e.g., the Internet). Similarly, the primary system 4 can facilitate communication within the primary system 4 via the communications network 26.

One or more functionalities of the primary system 4, or the secondary system 6, may be controlled or performed by the device 10. In example embodiments, the device is located within the primary system 4 and connects to the tool 8 directly or can connect to the tool 8 via the communications network 26. In example embodiments, the device 10 includes an instance of the tool 8 (not shown) to perform at least some functionality of the tool 8, such as detecting events.

Figure 2:
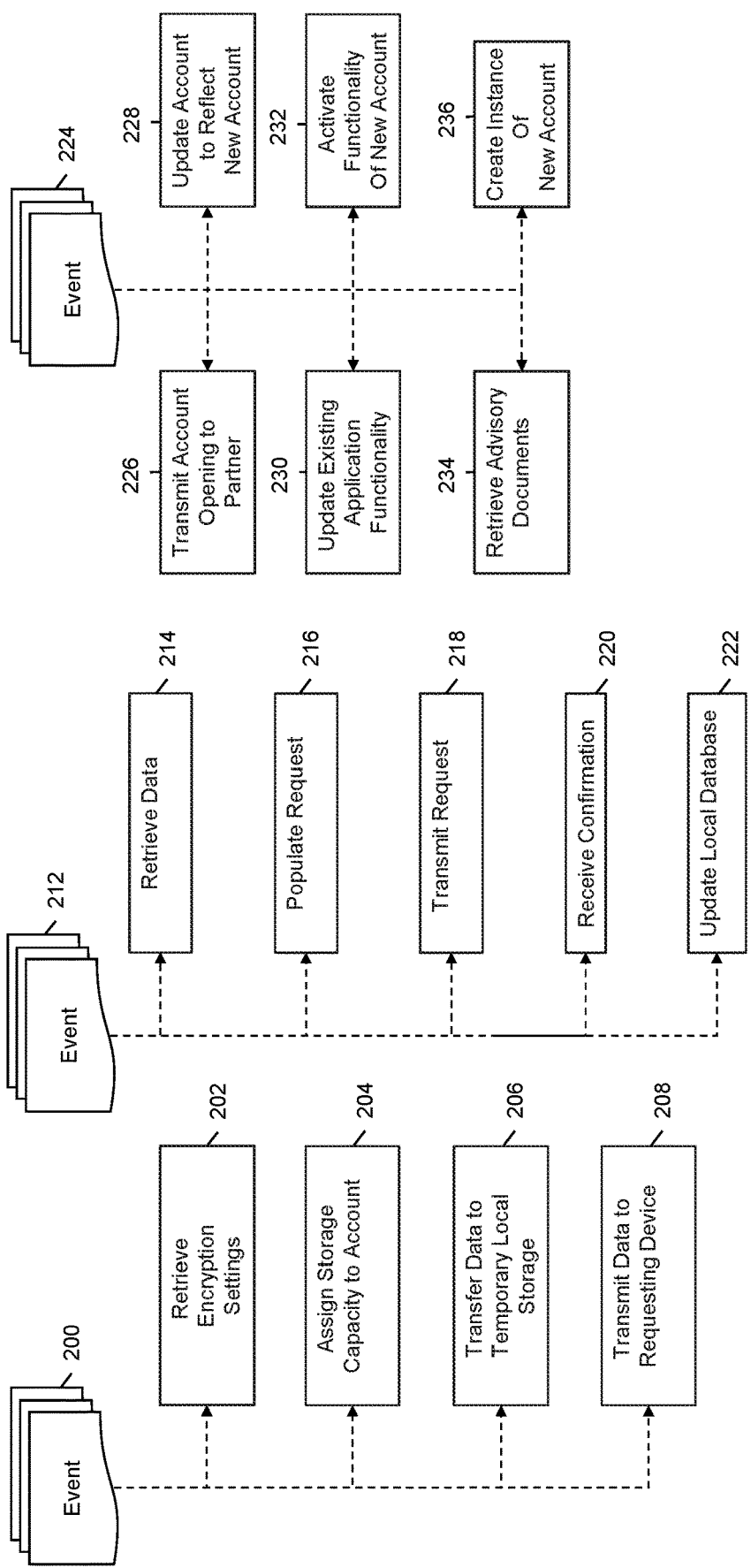
FIGS. 2A, 2B, and 2C are diagrams of example task decompositions.

Referring again to the decomposition module 16, FIGS. 2A to 2C show example decompositions of events into one or more tasks.

In FIG. 2A, an event 200 to transfer data stored on the secondary system 6 to the device 10 is received by the tool 8. As shown, the tool 8 decomposes the event 200 into the following tasks:

A task 202, wherein the tool 8 retrieves encryption settings associated with transmissions to the device 10.

A task 204, wherein the tool 8 determines whether a user account, in the first system 4, and associated with the event has sufficient assigned storage capacity, task 204 can include, if the account lacks sufficient storage capacity, assigning the requisite amount of storage capacity to the account.

A task 206, wherein the tool 8 transfers the requested data from the secondary system 6 to the storage capacity assigned to the account in task 204.

A task 208, wherein the tool 8 transmits the requested data stored in the storage capacity assigned to the account to the device 10.

In the example embodiment shown, task 202 is a task that can be performed within the primary system 4 by, for example, retrieving desired encryption settings associated with the requesting device 10 from a local database (e.g., the user was required to provide encryption settings during an account initiation process). While task 204 can be completed within the primary system 4, completing task 204 can require access to storage capacity separate from the storage capacity used to store account settings. For example, storage capacity to complete task 204 can be located on the cloud computing environment 12. In contrast to tasks 202 and 204, in the described example task 206 requires the use of the communication module 14 at least to communicate with the secondary system 6 to retrieve data stored thereon. The task 208 can be completed using the same transceivers as task 206, or task 208 may be completed with separate transceivers physically closer to the device 10 (e.g., where the data is stored in a remote location).

In FIG. 2B, an example decomposition of an event 212 to complete a form based on data stored in multiple systems is shown. For example, the request may be a request to convert rewards points in the primary system 4 by transferring points from the secondary system 6. The decomposition module 16 decomposes event 212 as follows:

A task 214, wherein information required to populate a form is retrieved. For example, where the event 212 includes a request to update an account in the primary system 4, information related to the primary system 4 account can be retrieved (e.g., account identifying information).

A task 216 can include generating or populating a request to the secondary system 4. For example, the request can be the request to extinguish entitlements in a related user account in the secondary system 6. The request can be populated with, for example, secondary system account information, authorization information, etc. The task 216 can include populating the request form into a format accepted by the secondary system 6, or trimming the data retrieved in task 214, and so forth.

A task 218 can include transmitting the populated request to the secondary system 6. In example embodiments, the request may be routed to a database storing the joint account details stored in a cloud computing environment 12.

A task 220 can include listening to receive confirmation from the secondary system 6. In at least some embodiments, task 220 is complete upon receiving a confirmation from the secondary system 6 that the task has been completed, or the task may be marked as complete only upon confirmation that the request has been processed.

A task 222 can include updating a database within the primary system 4 to reflect an increase in rewards corresponding with the rewards extinguished within the secondary system 6. For example, points may be added or subtracted from an account local to the primary system 4 associated with the requesting user.

In FIG. 2C, an example decomposition of an event 224 is shown. The event 244 is a request by a customer of the primary system 4 (e.g., a bank) to open a new account, wherein the new account includes at least in part opening an account within the secondary system 6. The event 224 can be decomposed into the following tasks:

A task 226, wherein the primary system 4 transmits a request to the secondary system 6 (e.g., a partner enterprise) to open a partner account. In example embodiments, the new account may be a new credit card associated with the primary system 4, and the partner may be a credit card partner (e.g., an airline) associated with the secondary system 6.

A task 228 can include updating a database local to the primary system 4. In the example of the new credit card account, task 228 can include updating a general account or book of record associated with the user requesting the opening of the new account.

A task 230 can include transmitting instructions to a local instance of an application associated with the user account to upgrade existing functionality. For example, in the example of the new credit card account, task 230 may enable a mobile application installed by the user on the device 10 to access functionality of the mobile application limited to users with partnered credit card accounts.

A task 232 can include creating an account for or otherwise unlocking the functionality of an application separate from the application discussed in task 230. For example, task 232 can include generating new credentials for the user to access a separate credit card mobile application, or to authorize the separate credit card mobile application (e.g., an application associated with a payment processor which provides mobile payment functionality for multiple credit cards) in view of the new credit card account opening.

A task 234 can include retrieving and providing the advisory documents associated with the newly opened partner account. For example, task 234 can include retrieving legal documentation enabling the account opening, including disclaimers, warranties or other documents relevant to the account opening. The advisory documents or other documents may be stored on the primary system 4 separately from the account information discussed in the earlier tasks.

A task 236 can include creating a new account separate from the general account in task 228. Information about the new account may be stored on a database separate from the database referred to in task 228. For example, a new account stored on a book of record for credit operations can be created and linked to a general user account.

Collectively, the event 224 can include updating multiple authoritative databases (e.g., a general account book of record, a credit card book of record, etc.) within a primary system 4. In addition, at least some of the tasks associated with event 224 require completion or notification of the secondary system 6 and can further require notification of the requesting user.

Decomposition can be conducted so that each of the tasks incorporates one or more parameters. For example, each task can be an object with certain variables generated as a result of decomposition, wherein the variables can be responsive to: a priority compared to other tasks of the one or more tasks (e.g., 1 of 40), whether the task is optional compared to other tasks of the one or more tasks, a routing destination upon task failure, a required completion time associated with the task, a subsequent task of the one or more tasks, whether a previous route which included this task failed, and a number of times the task itself failed, etc.

Figure 3:
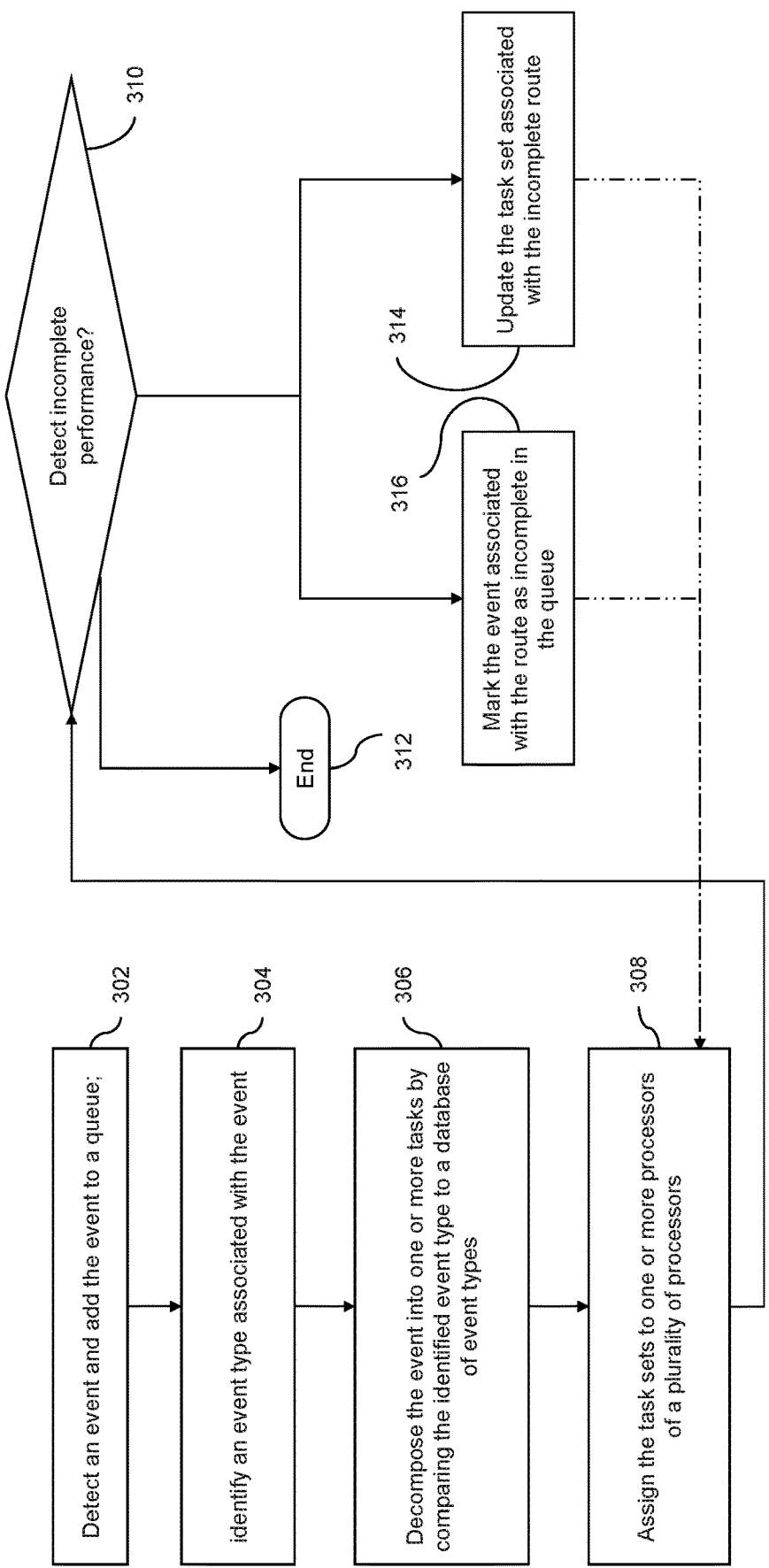
FIG. 3 is a flow chart of an example method for handling real time transactions.

Referring now to FIG. 3, a method of handling real-time transactional events is shown. For illustrative purposes, the method is discussed with reference to the events of FIGS. 2A to 2C, and with further reference to FIGS. 4 to 6. It is understood that the reference to FIGS. 2A to 2C, and 4 to 6 is merely illustrative and is not intended to limit the scope of the shown method.

Figure 4A:
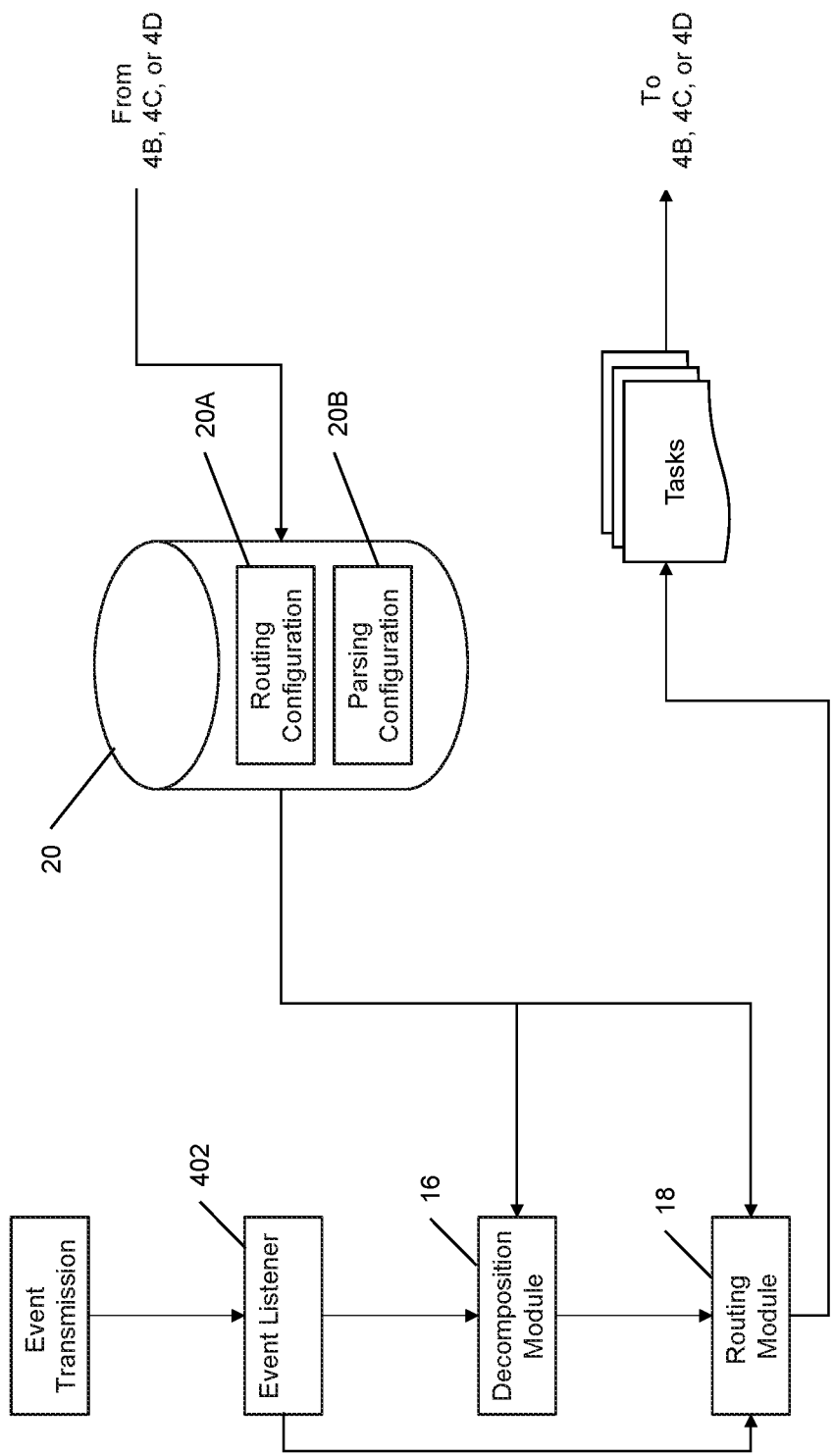
FIG. 4A is a schematic diagram for processing real-time transactions.

At block 302, an event is detected and added to a queue. As shown in FIG. 4A, event detection requires an event transmission (e.g., a request from a user) which is detected by an event listener 402. The detected transmitted events are added to a queue managed by the routing module 18 for tracking. Events can be configured to stay in the queue of the routing module 18 until marked as completed or incomplete.

In example embodiments, the event is detected by the routing module 18 scanning a location designated for maintaining an event queue, such that event detection and adding to the queue happen simultaneously. The event detection can occur by assessing whether the events added to the queue comply with object descriptors or other parameters defining events that can be recognized by the routing module 18.

At block 304, the decomposition module 16 identifies an event type associated with the detected event. For example, the event type may be in account opening (e.g., event 224), a media data transfer (e.g., event 200), a form completion event (e.g., event 212), transferring of digital information between systems which generate data during operation (e.g., machines, sensors, etc.), and so forth. At least one of the decomposed tasks requires downstream processing. For example, tasks 202, 218, and 226 require downstream processing by the secondary system 6.

In example embodiments, the event type is identified by comparison to an event catalog stored within the configuration database 20 (the event catalog of configuration database 20 is labelled as parsing configuration 20B in FIG. 4A). The parsing configuration 20B can be stored separate from tool 8 in the primary system 4, so that the tool 8 and configurations may be separately updated and tested. Although shown as separate elements in FIG. 4A, the event listener 402, the decomposition module 16, and the routing module 18 can be a single module within the tool 8 or stored separately from tool 8.

The parsing configuration 20B can include a list of event types authorized by the operator of the primary system 4 and a protocol or mapping associated with the authorized event type. For example, the parsing configuration 20B can include as authorized event types events which have associated tasks deemed sufficiently robust to complete an event type with a desired reliability.

At block 306, the decomposition module 16 decomposes the event into tasks or task sets by comparing the detected event to event types in the parsing configuration 20B. For example, the routing module 18 can be configured to listen for only event types enumerated in the parsing configuration 20B, and upon identifying whether the event transmission complies with the enumerated event type in the parsing configuration 20B, the decomposition module 16 can decompose the event into the task sets associated with the event type as indicated in the parsing configuration 20B.

Tasks can be identified or labelled as mandatory. Mandatory tasks can be mandatory relative to other tasks, or mandatory for the completion of the event. It is understood that different events can have different mandatory tasks, that different events may have the same mandatory tasks that differ in how they are mandatory relative to other tasks in the event, and that various singular tasks or combinations of tasks can be identified as mandatory to completing an event. To provide an example, the task 406C may include both the task 220 and the task 222 of the event 212, wherein the task 220 is marked as mandatory relative to the task 222, as may be the case where rewards obligations are being transferred to the primary system 4. The computing resource 404 is therefore required to receive confirmation from the secondary system 6 prior to the primary system 4 accepting the additional obligation to avoid potential double spending, even though the task 222 can be completed without the input of the secondary system 6. An alternative task decomposition of the event 212 can identify the task 222 as a mandatory precursor to task 218, for example in the case of a transfer of an obligation out of the primary system 4.

In at least some example embodiments, each event can be performed with various combinations of tasks stored in the parsing configuration 20B. For example, the parsing configuration 20B can include a plurality of tasks which can be combined in various combinations to complete an event. The task 204 of the event 200, for example, which requires assigning storage capacity to an account, can be completed by assigning storage capacity in any one of multiple locations where storage capacity may be reserved (e.g., on a cloud computing environment 12, on a local server, on a server local to the primary system 4 but in a different location from the previously mentioned "local server", etc.). The decomposition module 16 can be configured to selectively filter the required tasks. For example, the decomposition module 16 can be configured to select the fewest number of tasks to complete the event, the tasks which will utilize the least amount of processing capability, the tasks with the lowest expected completion time, the tasks which require processors that have both availably and access to the necessary computing resources (e.g., access to the necessary databases, etc.), and so forth.

Each task can be computer executable code, and decomposition by the decomposition module 16 can include providing the computer executable code and parameters in a data structure, where the parameters are responsive to at least one of: priority requirements compared to other tasks of the one or more tasks or task set (e.g., whether a task is mandatory), whether the task is optional compared to other tasks of the one or more tasks, a routing destination upon task failure (e.g., a backup processor may be specified as a result of task decomposition), a required completion time associated with the task, a subsequent task of the one or more tasks, a subsequent route for completion, a parameter for subsequent manipulation to tabulate whether the previous route failed or not, a parameter for subsequent manipulation to tabulate a number of times the route failed, etc. In example embodiments, a parameter may be associated with the computing resources 404, upon completion of a mandatory task, generating and transmitting a notification of completion to the routing module 18 to facilitate event status tracking.

In example embodiments, the parsing configuration 20B is continually updated to reflect new processes or changes to processes which depend on secondary system 6. In at least some example embodiments, the parsing configuration 20B can be updated by either the primary system 4, or the secondary system 6, allowing the respective parties to seamlessly update communications associated with predefined tasks with new instructions. For example, the secondary system 6 can update the parsing configuration 20B to require additional information for a particular event type, and an agent of the primary system 4 may subsequently update tasks associated with aforementioned event type.

At block 308, the decomposed task sets are assigned to one or more processors of the plurality of processors of the primary system 4 by the routing module 18. The routes assigned to the tasks include at least one route defined at least in part by communicating with a downstream processor.

The routes assigned to the decomposed tasks can be assigned at least in part based on predefined routing data stored in a route configuration 20A of the configuration database 20. For example, certain processors of the tool 8 can be designated as processors which have access to certain resources (e.g., databases), referred to in the alternative as resources access criteria, where other processors may have their access restricted. The access can be access to physical resources, or processor limitations, and the like. For example, the route configuration 20A can be used to assign tasks to the processors having the access to the requisite resources. In another example, certain processors of the tool 8 can be designated for communicating with the downstream processor (i.e., a processor of secondary system 6). Predefined routing data may implement preferential route assignments to certain processors, wherein the certain processors of the first system 4 are expected to have a lower latency in completing the task. In at least some example embodiments, the tasks are assigned based access to messaging hardware, access to ancillary information required to complete mandatory tasks (e.g., if a mandatory task requires near field communication technologies, access to one or more redundant channels (e.g., communication modes having a failsafe), real time or periodically updated information as to processor capacity, and so forth.

Route assignments can be implemented by, for example, appending metadata to the task, which metadata indicates a processor or route location in addition to the task itself, or appending metadata of a subsequent task in each preceding task, and so forth. As with the parsing configuration 20B, the routing configuration 20A can also be updated periodically or continually by the primary system 4.

FIGS. 4B to 4D, in combination with FIG. 4A, each show an example route path being travelled by example tasks. In FIG. 4B, the computing resource 404 of the primary system 4 receives a transmission including an assigned task 406A. In the embodiment shown, the computing resource 404 is required to access a database 408 of the primary system 4. For example, task 406 can be task 202 wherein encryption settings for communication with a downstream processor are accessed from a database 408 local to the primary system 4.

The task 202 can specify that the request that computing resource 404 sends to database 408 be completed with a protocol that requires database 408 (or microcontroller or microprocessor thereof) to provide the encryption settings directly to computing resource 404. In at least some example embodiments, the request to the database 408 associated with task 202 can result in a microprocessor associated with the database 408 providing the requested encryption settings to the routing module 18.

In FIG. 4C, the computing resource 404 receives or retrieves the assigned task 406B. Based on the routing data, the computing resource 404 transmits at least part of the task 406B to the secondary system 6. For example, task 226 of the event 224 can be implemented by computing resource 404 transmitting a request to open an account to the rewards partner. In this example, the computing resource 404 only needs an acknowledgement that an account has been opened in order for the computing resource 404 to determine whether the task 226 has been completed by the secondary system 6. Similar to FIG. 4B, the secondary system 6 may be configured to respond directly to the computing resource 404, or to respond to another computing resource of the primary computing environment.

FIG. 4D shows an example where the computing resource 404 receives or retrieves the assigned tasks 406C wherein one aspect of the task is mandatory relative to another aspect of the task. Alternatively stated, at least one part of task 406C (the downstream task) is dependent upon another task (the upstream task). The routing data associated with the assigned task 406C instructs the computing resource 404 to perform at least a portion of the task 406C (task 406D) in association with another computing resource within the primary system 4 (shown as the cloud computing environment 12) and upon completion of task 406D to complete at least another portion of the task 406C (task 406E) associated with the downstream processor. To complete the tasks, the computing resource 404 first completes task 406D prior to commencing task 406E. Although the task associated with the downstream processor is identified as the dependent task, it is understood that the downstream processor associated task can be the mandatory task. In example embodiments, the route is configured such that the computing resource 404 completes mandatory tasks associated with downstream providers to manage risk associated with the multiparty transactions. As with FIG. 2B, task completion may be tracked solely based on communication between the computing resource 404 and, for example, the cloud computing environment 12, or it can be completed with acknowledgement of completion being sent by the cloud computing environment 12 to another resource of the tool 8.

Referring again to FIG. 3, at block 310, the routing module 18 determines whether tasks of routes assigned in block 308 are incomplete. Task incompletion can be measured in a variety of manners, including based on, for example, whether an acknowledgement from the downstream processor has been received, whether a positive indication of task failure was received by the routing module 18 from one of the processors of the tool 8, whether the necessary data was retrieved from the downstream processor, and so forth. In at least some example embodiments, the routing module 18 periodically or continually (e.g., in real time) monitors the status of all tasks assigned to the routing module 18. Task incompletion can be based on whether acknowledgement for the task associated with the secondary system 6 is received within a designated location in the primary system 4. In example embodiments, the block 310 solely includes determining whether all of the mandatory tasks required to complete a requested event are completed.

In at least some example embodiments, various instances of the routing module 18 can be operated simultaneously by the tool 8. For example, a first instance of the routing module 18 can be used for routes where no task has failed, and a second instance of the routing module 18 can be used for routes including an incomplete task. In example embodiments, at least some of the various instances of the routing module 18 are redundant, promoting robustness during operation of the tool 8.

At block 312, where all of the tasks or routes associated with the event are marked as completed, the routing module 18 ceases to track the event. In at least some example embodiments, where all mandatory tasks associated with the event are marked as completed, the routing module 18 ceases to track the event notwithstanding unresolved mandatory tasks. In response to detecting or receiving a completed task, the routing module 18 can be configured to store the completed task and related data in a separate database to maintain a log of all completed tasks for troubleshooting. The tool 8 may subsequently enter a standby mode, or an active listening mode to listen for new incoming events.

Where incomplete performance is detected, the computing resource 404 can proceed to either block 316 or block 314.

At block 314, computing resource 404, or another element of tool 8 (e.g., routing module 18) updates at least one task associated with the incomplete route. For example, the computing resource 404 can identify one or more functionalities associated with the event and generate one or more messaging tasks to notify the event requester (e.g., an application on device 10) that the one or more functionalities are inactive. For example, where the event is event 224, the computing resource 404 can generate a message to the requester notifying the requester that the account has not been opened. The contents of the message, the type of message, and further particulars can be generated based on predefined configurations stored within configuration database 20. A higher priority can be assigned to the generated one or more messaging tasks relative to other tasks in the route to ensure that the requesting user does not have an erroneous misunderstanding that an event has occurred.

At block 316, a task route may be actively marked as incomplete, as compared to its initial status as incomplete stored in a first instance by the routing module 18. For example, computing resource 404 can detect an attempt and a resulting failure of the attempted communication with the secondary system 6. Task incompletion can be detected where secondary system 6 does not provide an expected confirmation, an expected content, etc. Incomplete performance can also include failures which result from issues outside of the substantive performance of the task. For example, where a request for communication has timed out, or where channel designated for communication with the secondary system 6 is inactive, the computing resource 404 can notify the routing module 18 of the failure.

Marking an event which is dependent upon the secondary system 6 as incomplete can result in the routing module 18 modifying parameters associated with the route, including parameters associated with tasks other than the failed task. In example embodiments, the failed task may be assigned to a second instance of the routing module 18 used to track and complete failed tasks. For example, referring now to FIG. 5A, where task 202, originally assigned to routing module 18A, has failed, all tasks which rely on task 202 as a mandatory precursor may also similarly be assigned to the second instance of the routing module 18B. Therefore, tasks 208 and 210, which require the encryption settings to store the transfer data in a manner that is capable of being interpreted by the device 10, are similarly assigned to the routing module 18B. As task 204 does not rely upon encryption in order to assign storage capacity local to the system 4, the responsibility of tracking task 204 can remain with routing module 18A.

In another example, referring now to FIG. 5B, where task 214 fails (e.g., where the secondary system 6 does not respond as to whether certain data is stored thereon), the computing resource 404 can assign task 214 to routing module 18B. Notwithstanding that other tasks associated with event 212 are dependent upon task 214, they are not transferred to the routing module 18B. This configuration may be advantageous because of the simplicity in tracking events and the associated increased robustness, as a status of the event can be determined at a glance from the contents of the second instance of the routing module 18B and task parameters identifying the route.

In another example, referring now to FIG. 5C, upon failure of any of the mandatory tasks 226 through task 234 of event 224, the events can be retained in the routing module 18A to re-attempt the task. The failure can trigger routing module 18A instructing routing module 18B to generate certain tasks associated with the failure, including task 602 to generate a message notifying the event requester of the potential delay, and task 604 to transmit the message to the event requester. In another example embodiment (not shown), a third instance of the routing module 18 can be used to track the failed tasks of tasks 226 through task 234. Dispersing the tasks among various instances of the routing module 18 can, in the event that a particular processor controlled by a particular instance of routing module 18 is in part responsible for the incomplete performance, increase robustness by reassigning tasks to different instances of routing modules 18 controlling different processors.

Any instance of routing module 18 can modify parameters associated with the tasks and/or routes assigned to it. In example embodiments where a subsequent instance of the routing module 18 (i.e., a routing module instance other than the instance responsible for the initial assignment of a decomposed task to a route) is assigned routes having at least one failed task, only the subsequent instances of the routing module 18 can be permitted to modify parameters. In at least some example embodiments, the routing module 18B can modify a time associated with attempting the route. For example, where the task 226 initially fails, and is assigned to the routing module 18B, the second queue may assign a re-attempt time as being no earlier than close of business or the end of the day on the same date as the original failure. In this way, where the secondary system 6 daytime volume of processing transactions creates challenges, changing the re-attempt parameters may increase the likelihood that the request will be processed by avoiding daytime volume related latency and other issues. In example embodiments, the routing module 18 modifies the parameter responsible for defining the processor assigned to complete the failed task. In this way, robustness of the system can be increased as potential problems with one processor which are undetected are avoided. The modified parameter can be a priority of the route compared to other tasks or routes associated with the event. For example, where failures of a particular type are common (e.g., responsiveness failures due to overloading) in interacting with the secondary system 6, and there are historical expectations that said issues can be resolved relatively quickly, the routing module 18B can reassign tasks other than the tasks which interact with the secondary system 6 a higher priority in anticipation of incomplete performance being rectified relatively quickly. In this way, bottlenecks can be avoided.

In example embodiments where more than one instance of the routing module 18 tracks tasks, the system 4 may be able to resiliently withstand failures. For example, the primary system 4 can detect a failure of the routing module 18, or any of the processors of the plurality of processors of primary system 4 (e.g., where the processor does not respond to requests, where the system detects a reboot operation, etc.) and have redundant task status information stored with each of the instances of the routing module 18. For example, upon detecting the failure, the primary system 4 can be configured to (e.g., via the computing resource 404) determine a status of one or more routes, or events, or tasks, based on the tracked completion of tasks stored in the instances of routing module 18. Referring again to FIG. 5B, the completion status of the event 212 can be determined upon review of a memory keeping logs of tracked tasks in either of the routing modules 18A, 18B. Routing module 18B in FIG. 5B including records of the downstream processing task 214 indicates the task is incomplete, and therefore all tasks dependent on task 214 are similarly incomplete. Alternatively, where downstream dependent tasks are marked as incomplete without the mandatory task in the same queue, the computing resource 404 can determine the state of completeness of the events.

Once block 314 or 316 are completed, the method may loop back to the block 308. In this way, tasks within the route can be continually processed without having the tasks in a persist state within the routing module 18.

Whether an incomplete task is processed in accordance with block 134 or block 316 a parameter can be stored within the configuration database 20. In at least some example embodiments, the routing module 18 determines whether the block 134 or block 316 is implemented based on current primary system capacity.

The primary system 4 and/or the secondary system 6 may also include a cryptographic server (not shown) for performing cryptographic operations and providing cryptographic services (e.g., authentication (via digital signatures), data protection (via encryption), etc.) to provide a secure interaction channel and interaction session, etc.

Such a cryptographic server can also be configured to communicate and operate with a cryptographic infrastructure, such as a public key infrastructure (PKI), certificate authority (CA), certificate revocation service, signing authority, key server, etc. The cryptographic server and cryptographic infrastructure can be used to protect the various data communications described herein, to secure communication channels therefor, authenticate parties, manage digital certificates for such parties, manage keys (e.g., public and private keys in a PKI), and perform other cryptographic operations that are required or desired for particular applications of the primary system 4 and/or the secondary system 6. The cryptographic server may be used to protect the financial data, transaction data, personal data by way of encryption for data protection, digital signatures or message digests for data integrity, and by using digital certificates to authenticate the identity of the users and devices 10 to inhibit data breaches by adversaries. It can be appreciated that various cryptographic mechanisms and protocols can be chosen and implemented to suit the constraints and requirements of the particular deployment of the primary system 4 and/or the secondary system 6 as is known in the art.

Figure 6:
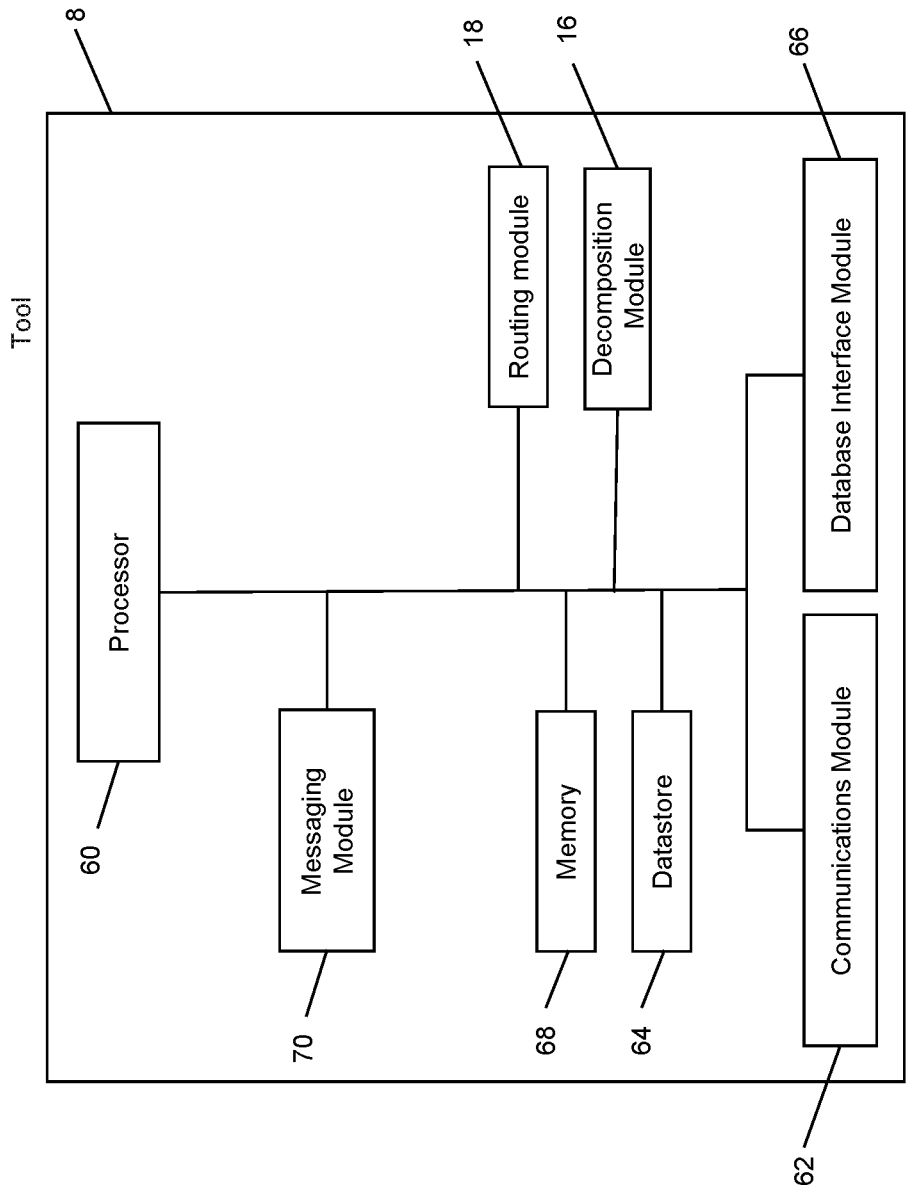
FIG. 6 is a schematic diagram of a tool for processing real-time transactions.

In FIG. 6, an example configuration of the tool 8 is shown. In certain embodiments, the tool 8 may include one or more special purpose processors 60, a communications module 62, and a data store 64 or datastore interface module 66 for storing or retrieving, respectively, the configuration database 20 and any data associated with task performance or decomposition. Communications module 62 enables the tool 8 to communicate with one or more other components of the computing environment 2, such as the secondary system 6, via a bus or other communication network, such as the communication network 26. The tool 8 includes at least one memory or memory device 68 that can include a tangible and non-transitory computer-readable medium having stored therein computer programs, sets of instructions, code, or data to perform the processes and/or methods set out herein for execution by processor 60. Messaging module 70 can be used to generate the messaging tasks described herein. It can be appreciated that any of the modules and applications shown in FIG. 6 may also be hosted externally or available to the device 10 (e.g., stored in the cloud computing environment 12 and accessed via the communications module 62).

It will be appreciated that only certain modules, applications, tools and engines are shown in FIGS. 1 to 6 for ease of illustration and various other components would be provided and utilized by the primary system 4, the secondary system 6, and device 10, as is known in the art.

It will also be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information, and which can be accessed by an application, module, or both. Any such computer storage media may be part of any of the servers or other devices in the primary system 4, the secondary system 6, or the device 10, or accessible or connectable thereto. Any application or module herein described may be implemented using computer readable/executable instructions that may be stored or otherwise held by such computer readable media.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

The steps or operations in the flow charts and diagrams described herein are just for example. There may be many variations to these steps or operations without departing from the principles discussed above. For instance, the steps may be performed in a differing order, or steps may be added, deleted, or modified.

Although the above principles have been described with reference to certain specific examples, various modifications thereof will be apparent to those skilled in the art as outlined in the appended claims.

The invention claimed is:

1. A system for handling real-time transactional events, the system comprising:
a processor;
a communications module coupled to the processor; and
a memory coupled to the processor, the memory storing computer executable instructions that when executed by the processor cause the system to:
identify an event type associated with a detected event, wherein the event type requires downstream processing by at least one provider;
decompose the event into one or more tasks by comparing the identified event type to one or more event types that each associates downstream provider requirements to tasks and routes; and
assign one or more routes to the one or more tasks, wherein at least one of the one or more routes is defined at least in part by transmitting a request for downstream processing to the at least one provider.

2. The system of claim 1, wherein the computer executable instructions further cause the processor to:
upon detecting incomplete performance of the one or more routes, executing at least one of:
updating the tasks associated with the incomplete route; or
marking the event associated with the route as incomplete in the queue.

3. The system of claim 1, wherein the computer executable instructions further cause the processor to:
detect the event and add the event to a queue.

4. The system of claim 1, wherein the one or more event types are provided in a database.

5. The system of claim 1, wherein the one or more routes is defined by at least one processor of a plurality of processors.

6. The system of claim 2, wherein marking the event as incomplete includes computer executable instructions to further cause the processor to:
modify parameters associated with the incomplete route; and
complete the event with the modified parameters.

7. The system of claim 6, wherein the modified parameters include at least one of: a time associated with attempting the incomplete route, processors of the plurality of processors assigned to the incomplete route, and a priority of the incomplete route compared to other tasks or routes.

8. The system of claim 2, wherein marking the event as incomplete includes computer executable instructions to further cause the processor to assign tracking of the incomplete route to a second queue, the second queue modifying parameters associated with the incomplete route.

9. The system of claim 8, wherein the computer executable instructions further cause the processor to:
detect whether a failure occurs in the queue; and
determine a completion status of the event based on the tracked completion of tasks assigned to the second queue.

10. The system of claim 8, wherein the computer executable instructions further cause the processor to:
detect a failure of at least one of the plurality of processors defining the one or more routes; and
determine a status of the one or more routes based on the tracked completion of tasks assigned to either of the queue or the second queue.

11. The system of claim 2, wherein updating tasks associated with the incomplete route includes computer executable instructions to further cause the processor to:
identify one or more functionalities associated with the event;
generate one or more messaging tasks for notifying a requester that the one or more functionalities are inactive;
assign the generated one or more messaging tasks to the updated tasks; and
assign an elevated priority to the generated one or more messaging tasks.

12. The system of claim 1, wherein the computer executable instructions further cause the processor to:
determine mandatory tasks within the decomposed one or more tasks;
detect whether the mandatory tasks associated with the event have been completed; and
remove the one or more routes from the queue in response to determining the mandatory tasks have been completed.

13. The system of claim 12, wherein the computer executable instructions further cause the processor to:
determine which of the plurality of processors satisfies resource access criteria required to complete the mandatory tasks; and
assign the mandatory tasks to the determined processors.

14. The system of claim 13, wherein the satisfied resource access criteria specify one of: access to a protected database, access to messaging hardware, access to ancillary information required to complete the mandatory tasks, and access to one or more redundant channels.

15. The system of claim 4, wherein the computer executable instructions further cause the processor to update the database in response to receiving one or more configuration parameters from the at least one provider.

16. The system of claim 1, wherein each of the one or more tasks includes parameters responsive to at least one of: a priority compared to other tasks of the one or more tasks, whether the task is optional compared to other tasks of the one or more tasks, a routing destination upon task failure, a required completion time associated with the task, a subsequent task of the one or more tasks, whether a previous route failed, and a number of times the task failed.

17. A method of handling real-time transactional events, the method comprising:
- identifying an event type associated with a detected event, wherein the event type requires downstream processing by at least one provider;
- decomposing the event into one or more tasks by comparing the identified event type to one or more event types that each associates downstream provider requirements to tasks and routes; and
- assigning one or more routes to the one or more tasks, wherein at least one of the one or more routes is defined at least in part by transmitting a request for downstream processing to the at least one provider.

18. The method of claim 17, further comprising:
- upon detecting incomplete performance of the one or more routes, executing at least one of:
- updating the tasks associated with the incomplete route; or
- marking the event associated with the route as incomplete in the queue.

19. The method of claim 18, wherein marking the event as incomplete comprises:
- modifying parameters associated with the incomplete route; and
- completing the event with the modified parameters.

20. A non-transitory computer readable medium for determining anonymization system quality, the computer readable medium comprising computer executable instructions for:
- identifying an event type associated with a detected event, wherein the event type requires downstream processing by at least one provider;
- decomposing the event into one or more tasks by comparing the identified event type to one or more event types that each associates downstream provider requirements to tasks and routes; and
- assigning one or more routes to the one or more tasks, wherein at least one of the one or more routes is defined at least in part by transmitting a request for downstream processing to the at least one provider.

* * * * *